United States Patent [19]

Burrows

[11] Patent Number: 5,887,159
[45] Date of Patent: Mar. 23, 1999

[54] DYNAMICALLY DETERMINING INSTRUCTION HINT FIELDS

[75] Inventor: Michael Burrows, Palo Alto, Calif.

[73] Assignee: Digital Equipment Corporation, Maynard, Mass.

[21] Appl. No.: 763,647

[22] Filed: Dec. 11, 1996

[51] Int. Cl.⁶ ..................................................... G06F 9/38
[52] U.S. Cl. ........................ 395/567; 395/583; 395/586; 395/589
[58] Field of Search ................................... 395/567, 583, 395/589, 586

[56] References Cited

U.S. PATENT DOCUMENTS

| | | | |
|---|---|---|---|
| 5,479,620 | 12/1995 | Kiyohara et al. | 395/567 |
| 5,581,720 | 12/1996 | Kaba | 395/567 |
| 5,652,889 | 7/1997 | Sites | 395/708 |
| 5,732,242 | 3/1998 | Mowry | 711/136 |
| 5,778,423 | 7/1998 | Sites et al. | 711/118 |

*Primary Examiner*—Kenneth S. Kim
*Attorney, Agent, or Firm*—Robert A. Cesari; Cesari & McKenna, LLP

[57] ABSTRACT

A computer implemented method for dynamically setting hint fields of instructions. Machine executable code is modified during execution to locate and replace instructions having hint fields. The instructions are replaced with calls to intercept the execution flow and redirect to procedures of a monitor. During execution of the machine executable code, hint information is recorded in a memory. The recorded hint state information is analyzed to determine the most frequently occurring or best hint value. When a best hint value has been determined, the replaced instructions are restored with best hint values.

11 Claims, 6 Drawing Sheets

DYNAMICALLY DETERMINING INSTRUCTION HINT FIELDS

FIELD OF THE INVENTION

This invention relates generally to executing instructions in a processor, and more particularly to modifying instructions having hint fields.

BACKGROUND OF THE INVENTION

In modern computers, it is common to pre-fetch instructions. Then, when it is time to execute a next instruction, the instruction will readily be available. If instructions are fetched ahead of time, delays can be avoided. Normally, instructions are executed in a sequential order with respect to their addresses as maintained by a program counter (PC). Therefore, normal sequential pre-fetching is simple to perform.

However, some instructions are fetched from non-sequential addresses. For example, branch and jump instructions change the PC to a non-sequential address. In order to allow the pre-fetching of instructions from non-sequential addresses, the instructions may include "hint" fields. For example, on the ALPHA processor made by Digital Equipment Corporation, Maynard, Mass., a 16 bit hint field is provided with branch-to-subroutine, and jump-to-subroutine instructions.

The hint field, in part, specifies the low order bits of a likely target address. The low bits are enough to specify an address of an instruction-cache block. The hint field allows branch prediction logic of a processor to start an early instruction fetch from the likely target address. A correct prediction can save five to six cycles for certain ALPHA processors.

In most prior art applications, hint fields of instructions are statically determined when source code modules are processed to produce machine executable code. Static hint field predication is limited to determining hint fields for instructions where the target address is absolutely known. For example, the target address is the first instruction of a procedure of a shared library whose load address can be predetermined.

However, in object oriented programming using, for example, the C++ language, it is common to indirectly call a procedure (method) via a variable which is dynamically resolved at run-time. Obviously, in this situation, the likely target address cannot be predicted prior to run-time, and, the hint field cannot be set statically, e.g., the hint field is null. Consequently, instructions which are indirectly fetched in a non-sequential manner can cause delays. A solution is desired.

SUMMARY OF THE INVENTION

Provided is a computer implemented method for dynamically determining hint fields of instructions. Machine executable code of programs are associated with a monitor during execution. The monitor, while the code is executing, dynamically locates and replaces instructions which have hint fields.

The replacement instructions intercept the execution flow of the machine executable code and divert the flow to procedures of the monitor. The monitor procedures analyze the execution flow in order to determine hint information given to the dynamic execution environment.

In one aspect of the invention, the monitor maintains a hint prediction table in a memory to store the hint information. The prediction table has one entry for each replaced instruction. Specifically, each entry is indexed by a value which is derived from the unique address of the intercepting instruction. The hint information in each entry includes hit, count, and best hint values.

Every time the execution flow is intercepted, a current destination address is known. A current hint value, e.g., a relative displacement, can be determined from the current destination. The current hint value is compared with a stored best hint value for this instruction. If no best hint value is stored in the prediction table, then the current hint value becomes the best hint value.

If the current hint value is the same as the stored best hint value, then the hit value is incremented, otherwise, if different, then the hit value is decremented. If there is an underflow on the hit value, the stored best hint value is replaced with the current hint value.

In either case, an interception causes the count value, initially zero, to be incremented. When the count value overflows, e.g., it exceeds a predetermined threshold, then the best hint value is used to replace the statically determinable hint with the dynamically determined best hint value. This means the best hint value is the hint value which has occurred most frequently, and is therefore most likely cause a correct instruction fetch prediction. Dynamically determining hint field values improves the performance of the system.

DETAILED DESCRIPTION OF PREFERRED EMBODIMENTS

Figure 1:
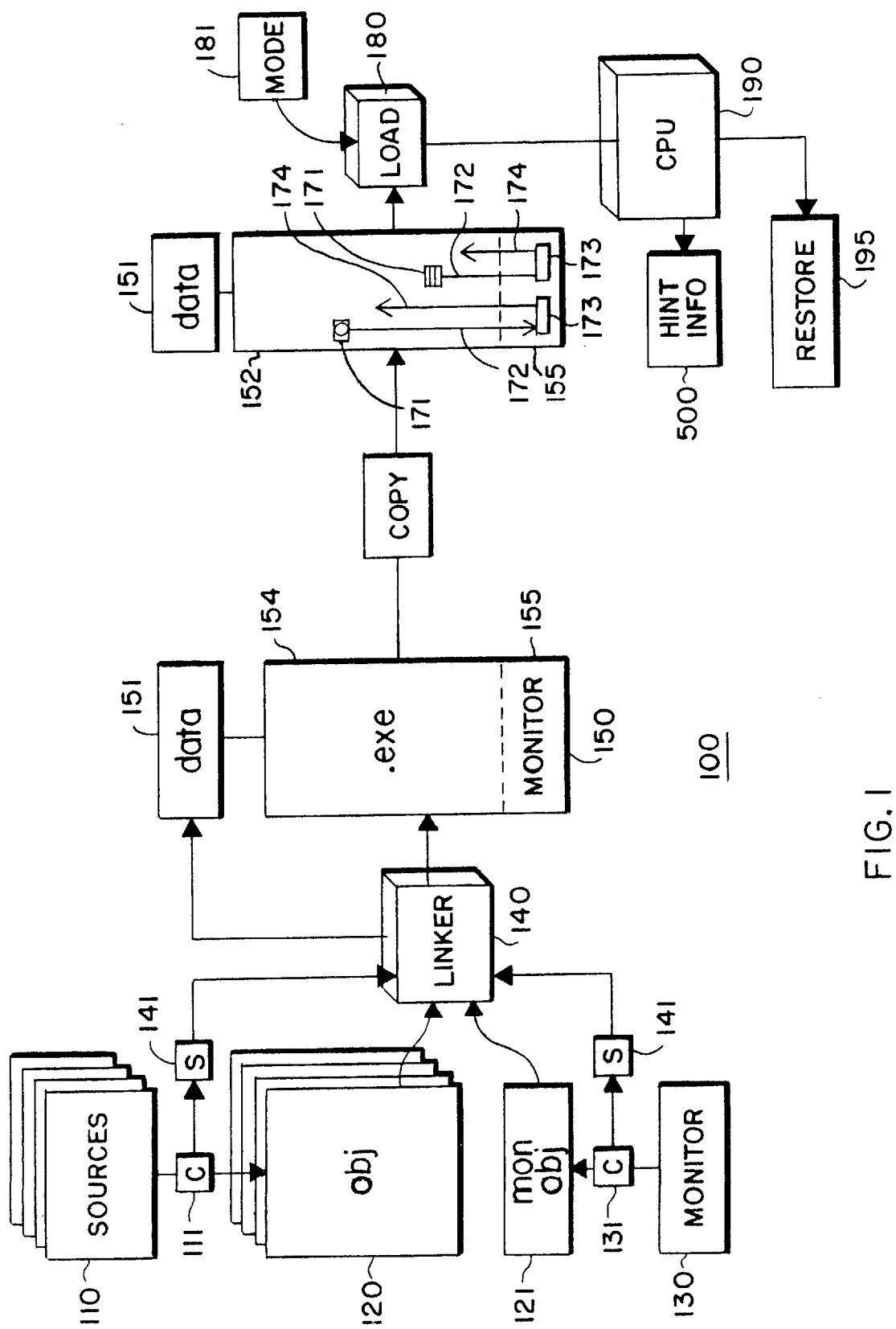
FIG. 1 is a top-level block diagram of a process for dynamically determining hint fields of instructions of machine executable code.

FIG. 1 shows a process 100 which can be used for dynamically determining hint fields of instructions of machine executable code. A programmer generates, for example, object-oriented source programs 110 using conventional programming techniques. The source programs 110, once processed, are intended for execution in a computer system (CPU) 190. The programs 110 can be compiled by a compiler 111 into object code modules (obj) 120. The object code modules 120 include instructions with hint fields. Hint fields help branch prediction logic of the CPU 190 to determine the address of a next instruction to be fetched. Execution cycles are saved if the instructions are correctly fetched. Instructions whose destination addresses can only be resolved at run-time have their hint fields set to null.

A monitor program 130 is also generated. The purpose of the monitor program 130 is to dynamically intercept the execution flow of the object modules 120 to record and analyze hint information. The exact details of how the program 130 can monitor the execution of the program 110 will be described in greater detail below. By dynamically monitoring the execution flow, "null" hint fields of instructions which have not been set by the compiler 111 can dynamically be set as the program is executing to improve performance. In addition, it is also possible to replace statically determined hint values with values which actually reflect the execution environment to improve performance. The monitor program 130 is compiled by compiler 131 into object module (mon obj) 121.

A linker 140 can link the object modules 120 into a machine executable image (.exe) 154. The executable image 154 is sometimes known as the "binary image." The linker 140 can also associate the monitor object modules 121 with the image 154 to generate an integrated image or "text" 150.

It should be noted that the linker 140 can have access to symbol tables 141 generated by the compilers 111 and 131. Using the symbol tables 141, the linker 140 can resolve, for example, data references and procedure calls that are common among the object modules 120–121. It should also be noted that the compiling and linking of the programs can also produce a data section (data) 151 storing constant values which are passed along with the text portion 150 of the program.

For the purpose of one embodiment, the program text or executable image 150 includes only machine executable instructions, e.g., operands and operators. All data are stored separately in the data section 151.

During an initial phase of the monitor 155, the image 154 or a copy thereof 152 is modified or "patched" by the monitor 155 when it is loaded by the loader 180 for execution in the processor 190. The monitor 155 locates and replaces selected instructions 171 of the code 152 or 154. Each selected instruction 171 is overwritten with a replacement instruction. For example, the replaced instructions 171 can be any instructions which include a hint field. More specifically, the replaced instructions 171 are those instructions which did not have their hint fields set by the compiler 111 or the linker 140. Typically, these instructions are indirect or computed sub-routine calls, although other types of instruction may also have hint fields.

The instructions 171 are replaced with "calls" 172 to procedures 173 of the monitor 150. Thus, the execution flow is intercepted. The procedures 173 are designed to examine, record, and analyze hint information 500 when the selected instructions 171 are about to execute. The recorded hint information 500 can be analyzed to predict a most frequently occurring, or "best" hint value. Once a determination has been made for the most frequently occurring hint value for the hint field, the replaced instruction can be restored in step 195 with the hint field filled in so that the performance of the system is improved.

In an alternative embodiment, the monitor object code 121 can be maintained separately in a "shared" library. Now, there is no need to link the object modules 120 and 121 together. Instead, the monitor object modules 121 can be loaded from the shared library when the machine executable code 152 or 154 is loaded.

Figure 2:
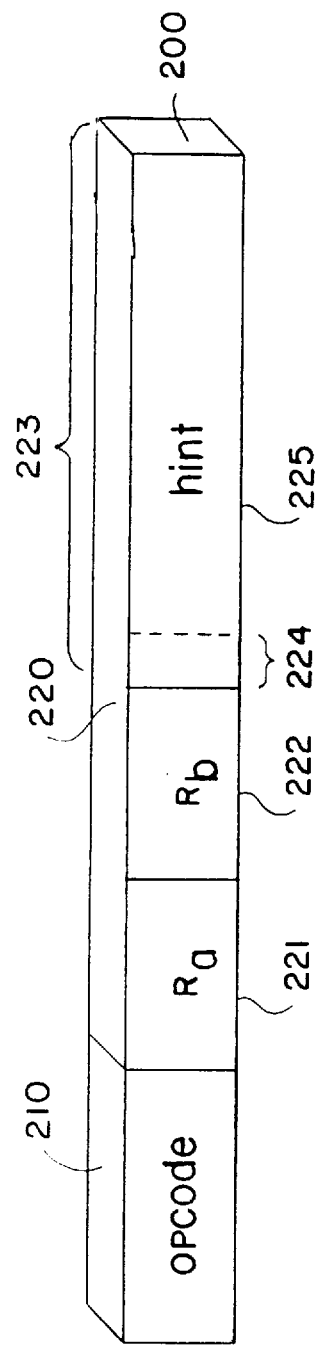
FIG. 2 is a block diagram of an instruction including a hint field.

FIG. 2 shows one format of a "branch" type instruction 200. The instruction 200 includes an operator field (opcode) 210, and operand 220. The operator can be, for example, jump-to-subroutine (jsr) or branch-to-subroutine. The operand 220 can be used to specify a target address. The operand 220 can include, for example, two register fields Ra 221 and Rb 222, and a hint field 223.

The hint field 223 can include two bits 224 and fourteen bits 225. The bits 224 indicate the opcode, e.g., 0=jmp, 1=jsr, 2=ret, and 3=jsr_coroutine. The opcode is used by the branch prediction logic to make PC and stack calculation. The bits 225 can store a displacement with respect to the current PC. The displacement can be resolved to an instruction cache block address which is passed to branch the prediction logic. It should be noted that the field 220 is nothing more than a hint. Therefore, correct setting of the bits can improve performance, but correct setting is not needed for correct operation. Executing the instruction 200 can cause the PC of the following instruction (jsr_PC) to be written to register Ra 221. The target address specified in register Rb 222 becomes the new PC.

In a preferred embodiment, the monitor 155 replaces each "jsr" instruction 171, which preferably has a null value in the hint field 220, with a "call" or bsr instructions. The bsr instruction directs the execution flow to one of the procedures 173 of the monitor 155. There is one procedure 173 for every general purpose register which can be used for a target address specification.

For example, if the instruction 171 to be replaced is of the form:

jsr Ra, Rb, 0.

e.g., target in Rb, and no hint, then the replacement instruction will be of the form:

bsr Ra, Rb_proc where Rb_proc is the label of the monitor procedure for indirect calls through register Rb.

Figure 3:
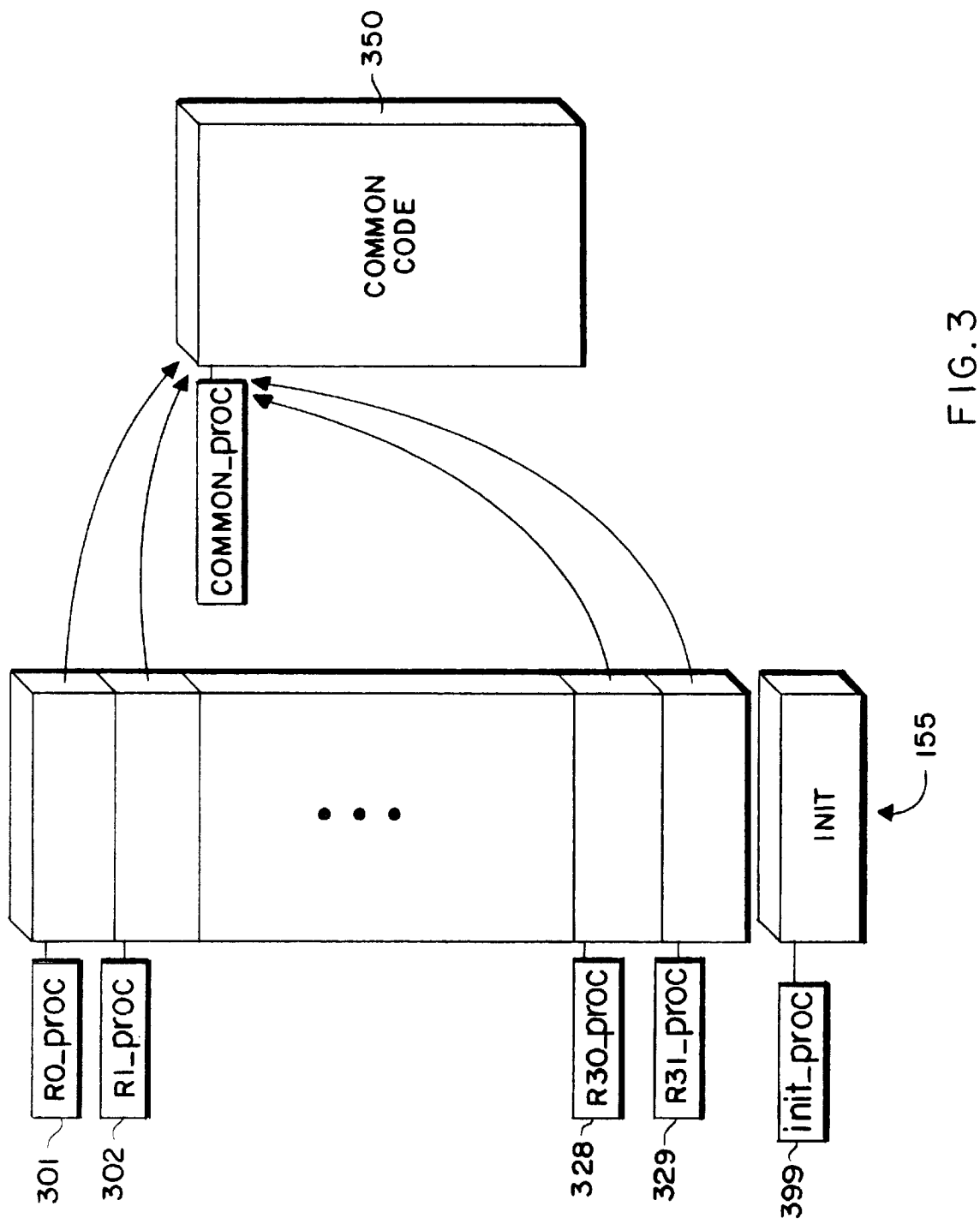
FIG. 3 is a block diagram of procedures of a monitor associated with the machine executable code.

In the ALPHA, twenty-nine registers are for general purpose, three have dedicated purposes (stack, zero constant, normal return address). Therefore, as shown in FIG. 3, the monitor 155 includes entry points 301–329 to monitor procedures. Having a different entry point for each general purpose register simplifies the initial identification of what register was used in the replaced instruction to hold the target address. Once the register has been identified and handled, common code 350 can be used for recording and analyzing hint information. The determination of a most frequently occurring or "best" hint field value is described in greater detail below.

As stated above with respect to FIG. 1, execution of the machine executable code is initiated by the loader 180. The loader can pass "environment" or mode parameters 181 which determine how and where the hint fields are dynamically being set, and whether or not the setting of the hint fields should be done in "debug" mode so that the programmer can follow how the hint fields are set. The environment parameters 181 can be processed by an initialization procedure (init_proc) 399 of the monitor 155. Upon completing, the initialization procedure 399 can call the main body of the executable code.

Figure 4:
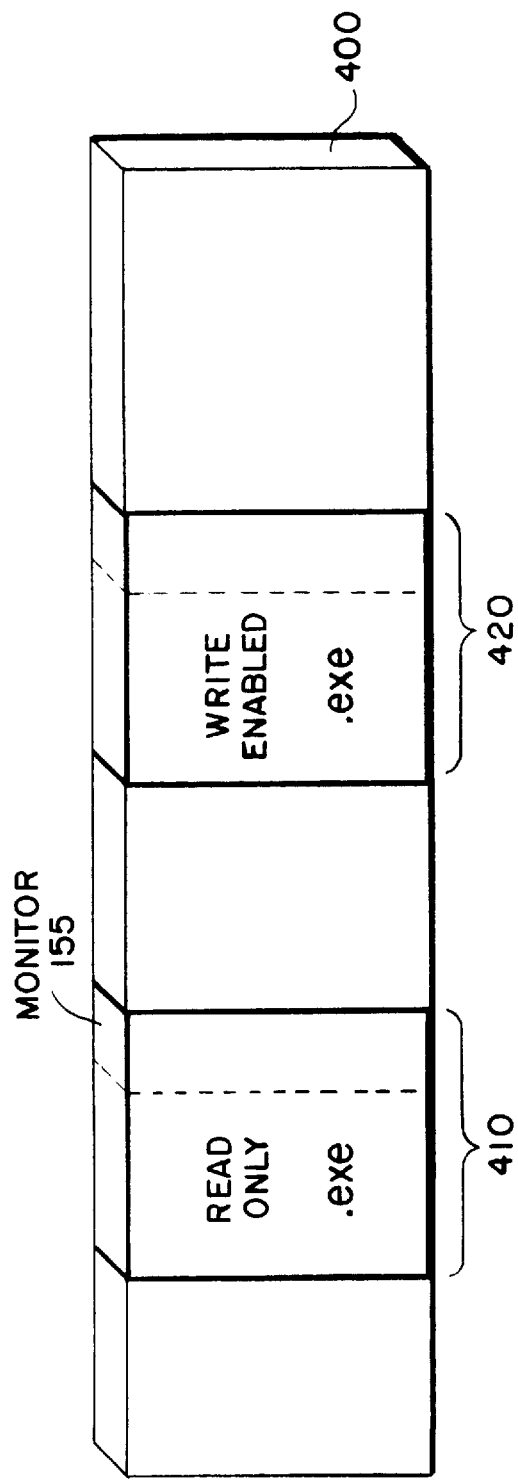
FIG. 4 is a block diagram of a memory storing copies of the machine executable code.

As shown in FIG. 4, depending on the environment parameters during the initialization process, the machine executable code is loaded into dynamic (main) memory 400. While executing the code 410, the monitor portion 155 can modify the code directly, indirectly, attended (debug mode), or unattended.

Alternatively, with different mode parameters, a second copy 420 can be loaded so that the original code remains unmodified (read-only). As another variation, any modifications to the second copy 420 can be in "write-through" mode. This means that any changes made to the copy 420 are immediately reflected in the statically stored machine code.

It should be noted that the memory 400 can be a virtual memory. Generally, a virtual memory has more addresses than those physically expressed. For example, virtual memory addresses have 32 or 64 bits, while the physical memory is only 16 MB, e.g., 24 bits. In a virtual addressing scheme, the copies 410 and 420 can be mapped to the same or different addresses to affect how and where the hint fields 220 are set.

Figure 5:
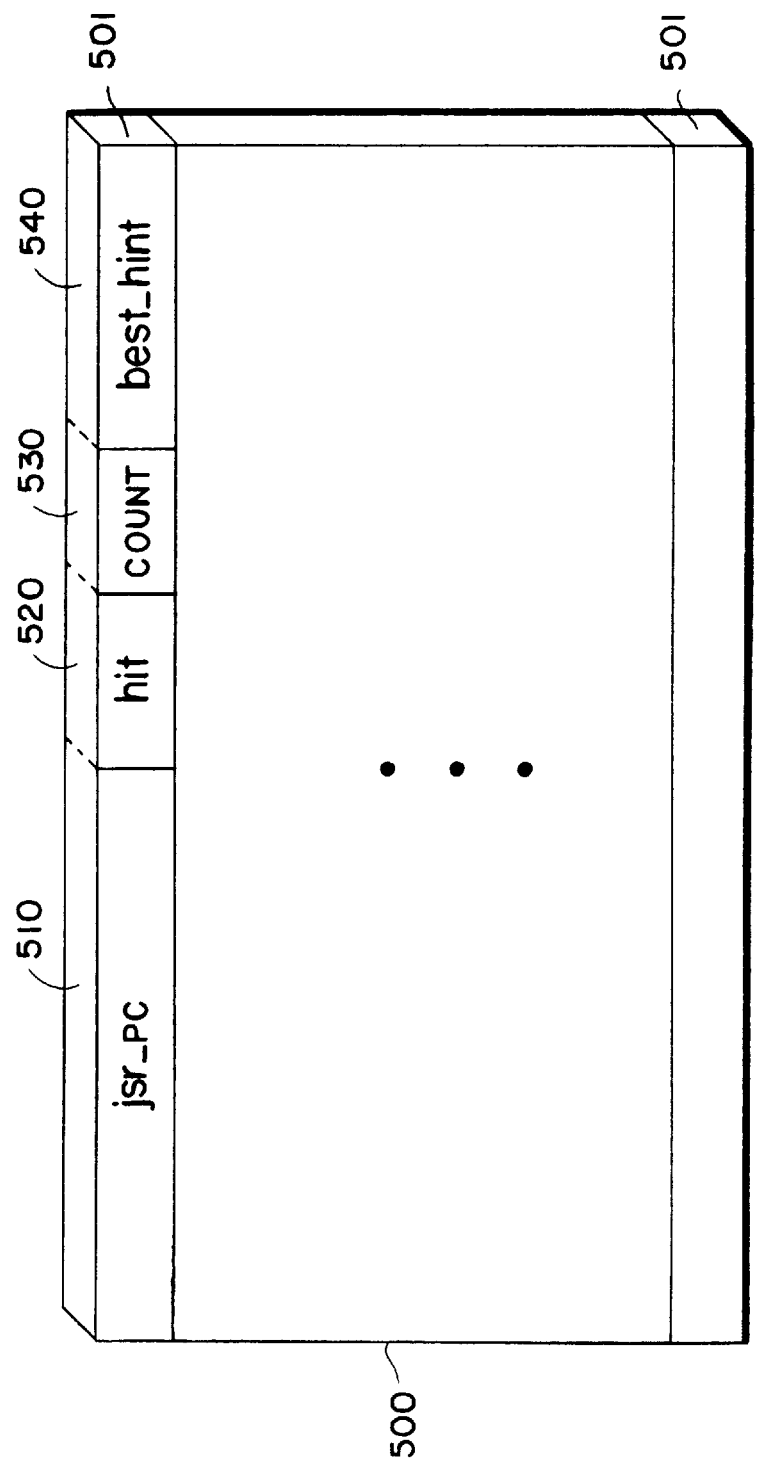
FIG. 5 is a block diagram of a hint prediction table.

As shown in FIG. 5, the initialization process, in addition to replacing instructions, also constructs a framework for a hint predictable table 500. In one embodiment, the prediction table 500 is indexed using a hash function. During operation, the table 500 is populated with a plurality of 64 bit entries 501. Each entry 501 includes a 32 bit jsr_pc field 510, an 8 bit hit field 520, an 8 bit count field 530, and a 16 bit best_hint field 540.

The jsr_pc field 510 uniquely identities one of the replaced instructions of the image. The field 510 is used as the hash index into the table 500. The count field 530 indicates the number of times the execution flow has been intercepted. The hit field 520 can be incremented and decremented. The best_hint field 540 yields a value which can be used in the hint field 220 of the replaced instruction. The value 540 is dynamically determined as the machine code is executing.

Figure 6:
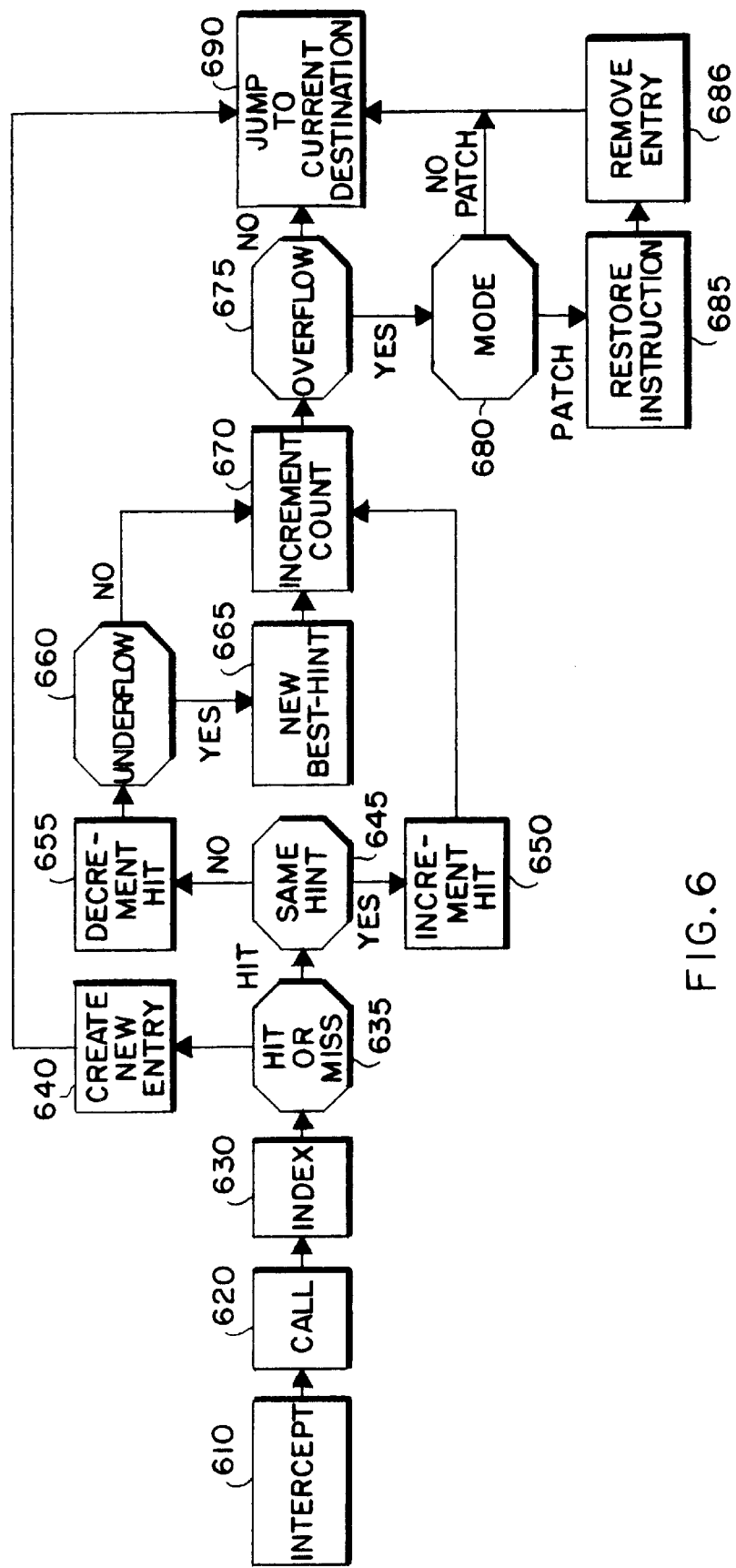
FIG. 6 is a diagram of a process for recording and analyzing hint information.

As shown in FIG. 6, during operation of the monitor 155, the execution flow is intercepted (610) at a replaced instruction. At this point, the PC value (jsr_PC) of the next sequential instruction (the current destination) will be loaded in an appropriate register. The flow is directed (620) to the procedures 301–329 of FIG. 3 identified with the register storing the target address.

The procedure can use the value (jsr_pc) to index (630) the prediction table 500 to determine (635) if there is a corresponding entry 501. In the case of a miss, create a new entry 640 and jump to the current destination address (690). The best-hint field 540 of the entry will be set to what the hint should be given the current execution context.

In the case of a hit, a determination is made (645) if the current hint is the identical to the one stored in the best_hint field. If the current hint is the same, then increment the hit field (650).

In the case that the current hint is not the same as the stored best_hint, then decrement the hit field 655. After decrementing, check to see if there is an underflow on the hit field (660). If there is an underflow, then replace (665) the best-hint with the current hint.

After incrementing or decrementing the hit field, increment the count (670), and check for an overflow (675). In the case of an overflow, check (680) an environment mode parameter. The mode may indicate that if the count overflows, a most frequently occurring hint has been determined, and the replaced instruction can be restored (685). Now that a hint value has been determined, the execution flow will no longer need to be intercepted. The corresponding entry can be removed (686) from the prediction table 500 before jumping to the current destination, step 690. On back-patching, depending upon the environment parameter, any copy of the machine executable code can be restored.

It should be understood that the procedures of the monitor 155 must preserve the execution state as it existed at the instant the execution flow was intercepted. Therefore, any registers used by the monitor procedures must be saved and restored. Alternatively, it may be possible to locate "free" registers.

Using the procedures and data structures as described herein, it can be determined that in many object-oriented programs, even though destination addresses are dynamically computed, an instruction at a particular PC address will call one method more frequently than others. This may be expected in an a program where a default value for multiple choices determines the "typical" execution flow.

In an alternative embodiment, the machine executable image can be patched to develop a "profile" of the execution flow by sampling the current and next program counter values. The profile samples can later be analyzed to determine a most frequently occurring "best" hint. It should be noted that even if the hint is incorrect, or not the most frequently occurring hint, the execution will be still correct, although delays may be incurred to recover the precise next program counter value.

It should also be noted that the disclosed technique can be used for other types of instruction which include hint fields. For example, some processors may include instructions having operands which are capable of indirectly accessing a memory address, and where a hint field is provided. It should also be noted that the processes described herein can be used to dynamically reset hint fields which were statically set to a "better" value.

In sample programs which have hint fields dynamically set as described herein, performance is measurably improved. For loops of a program which do nothing more than make an indirect call to a null procedure, the code runs about 30% faster.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A computer implemented method for setting hint fields of instructions of machine executable code executing in a processor, comprising:

intercepting the execution flow of the machine executable code for instructions having hint fields;

recording hint information in a memory;

analyzing the recorded hint information in the memory; and setting the hint fields of the instructions to a most frequently occurring hint value while the instructions are executing.

2. The method of claim 1 further comprising:

locating instructions having hint fields;

replacing the located instructions with calls to procedures for recording and analyzing the hint information; and restoring the replaced instructions with the instructions having hint fields set to the most frequently occurring hint value.

3. The method of claim 2 further comprising:

locating instructions having hint fields set to a null value.

4. The method of claim 2 further comprising:

indexing an entry of a table in the memory by an address at which the execution flow is intercepted;

storing the hint information in the indexed entry.

5. The method of claim 4 further comprising:

determining a hash value from the address to index the entry.

6. The method of claim 4 further comprising:

incrementing a count value every time the execution flow is intercepted; and restoring the calls when the count value exceeds a first predetermined threshold.

7. The method of claim 1 further comprising:

incrementing a hit value if a current hint value is identical to the most frequently occurring hint value;

decrementing the hit value if the current hint value is different than the most frequently occurring hint value;

replacing the most frequently occurring hint value with the current hint value if the hit value is less than a second predetermined threshold value.

8. The method of claim 2 further comprising:

linking the procedures to the machine executable code prior to executing the machine executable code.

9. The method of claim 2 further comprising:

associating the procedures with the machine executable code at the time that the machine executable code is loaded for execution.

10. The method of claim 1 further comprising:

setting the hint fields of the instructions in a copy of the machine executable code.

11. A computer implemented method for modifying instructions of machine executable code executing in a processor, comprising:

intercepting the execution flow of the machine executable code for instructions having hint fields;

recording hint information in a memory upon interception; and analyzing the recorded information in the memory to dynamically set the hint fields of the instructions.

* * * * *